UNITED STATES PATENT OFFICE.

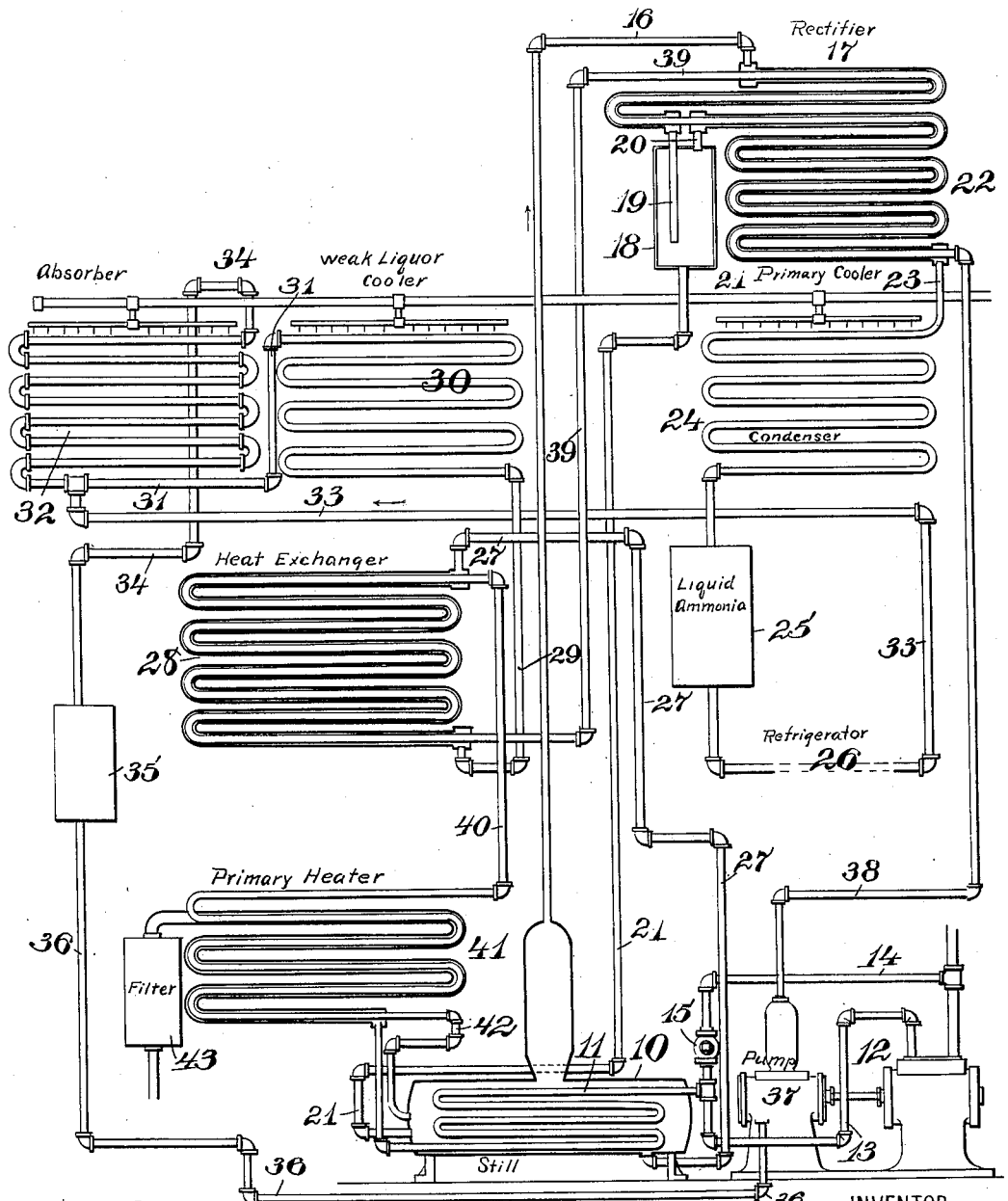

ABRAHAM DAY, OF BLOOMFIELD, NEW JERSEY.

REFRIGERATION SYSTEM.

No. 925,625.     Specification of Letters Patent.     Patented June 22, 1909.

Application filed July 18, 1907. Serial No. 384,379.

*To all whom it may concern:*

Be it known that I, ABRAHAM DAY, a citizen of the United States, residing at Bloomfield, in the county of Essex and State of New Jersey, have invented certain new and useful Improvements in Refrigeration Systems; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a refrigerating machine of the type that produces a low temperature, by absorption, in which, by heating ammonia or a similar substance, a separation of gas, from its aqueous solution, takes place and the hot gas is then condensed and cooled into a liquid, and subsequently evaporated to cool the surrounding elements to be cooled or frozen.

The object of this invention is to produce a highly efficient apparatus, and at the same time make the process economical by heating the aqueous solution and forming ammonia gas by means of steam from a pump in the machine, or by live steam, and to dry the hot gas by a suitable drier installed in the system, after the gas passes through a rectifier, and before it is passed through the condenser. The gas is then passed through an anhydrous receiver, usual in these systems, and is then ready for the freezing step. The ammonia used to do the cooling is passed in a reverse direction and is necessarily warmed by its cooling function, after refrigeration, and this warming is an advantage as the ammonia is then on its way to the preliminary or secondary heater from which it passes into the generator. It will thus be seen that by cooling the hot gas with the cool ammonia, and heating the ammonia returning to the generator, an economical coöperation is the result.

The invention is illustrated by the figure in the accompanying drawing, and shows a system diagrammatically.

The generator or still 10 is of any usual form and contains a coil 11 which receives either the exhaust steam from the pump 12, by means of the pipe 13, or the live steam from the boiler through the pipe 14. A reducing valve 15 shuts off the live steam until such time as the exhaust steam is inadequate for the purpose. The coil 11 heats the water in the generator 10, and hot ammonia gas passes up through the pipe 16 through the rectifier 17, which comprises inside and outside pipes, the outside preferably carrying the hot gas. This rectifier reduces the temperature of the gas from say 240° F., to about 160° F., and the hot ammonia gas then passes into a drier 18 by means of the pipe 19 and out through the pipe 20. The drier is an upright cylindrical receptacle 18, and the pipe 19 projects therein for the major portion of its length and has an open bottom. The outlet is arranged to open in the top of the cylindrical receptacle, thus the moisture is deposited and passes out through the pipe 21 which leads from the bottom of the receptacle 18. This drier, at this point, is important as it takes the water out of the gas, since water condenses more quickly than the gas, since 5% of water will decrease the refrigerating efficiency 15% or 20%. A pipe 21 conducts the extracted water back to the generator 10. The dry gas now passes through the pipe 20 into the primary cooling coil 22, in which it is further cooled. The pipe 23 then conducts it to the condenser 24, of the usual form, and the cooled and condensed ammonia then is deposited in the anhydrous receiver 25, where it is ready for entry in the refrigerating coil or media 26.

The weak ammonia water is forced by the pressure in the generator 10, through the pipe 27 into the exchanging coil 28, where it heats the ammonia on its way to the generator, exchanging heat for cold. The weak ammonia water is then conducted by the pipe 29 to the weak water cooler 30, and by means of a pipe 31 goes into the absorber 32, where it absorbs the ammonia gas from the refrigerating coil or media 26, which is fed to the absorber by the pipe 33. The rich liquor then goes through the pipe 34 to the rich liquor receiver 35, and by pipe 36 to the pump 37. The pump then passes the rich liquor up the pipe 38, through the previously described primary cooling coil 22, and the rectifier 17 to cool the hot ammonia gas, and is then on its way to the generator to be heated. It is gradually heated after absorbing the heat in the primary cooling coil 22, and the rectifier 17, by following the pipe 39 to the exchanging coil 28 and then through the pipe 40 to the primary heating coil 41, which is heated by the steam from the generator 10. The heated ammonia now enters the generator by the pipe 42 and the steam, after heating the coil or heater 41, is passed through a filter 43 and is conducted back to the boiler. The exchange of heat and cold, in these units of the system, promote a great efficiency, and attention is called to the novel arrangement of the rectifier and the cooling coil, in conjunction with the drier, which extracts the water from the hot ammonia gas.

Having thus described my invention, what I claim is:—

1. In a refrigerating machine, a generator, means for conducting steam through the generator to heat it, a primary heating coil, the steam from the generator heating the primary heater, an exchanging coil, a rectifier, a cooling coil, a drier, the drier comprising an upright cylindrical tank, a rectifier leading into the drier by a pipe extending downwardly for a major portion of the height of the drier the outlet from the drier leading from the top thereof, the hot ammonia gases passing from the generator through the rectifier the drier and the cooling coil, a pump for forcing the strong ammonia water through the cooling coil the rectifier the exchanging coil and the primary heater, an absorber, the weak ammonia passing through the exchanging coil and absorber and then to the pump to supply the strong ammonia water.

2. In a refrigerating machine, a generator, a rectifier, a cooling coil, the rectifier and the cooling coil being formed of an outside and an inside pipe, one of the pipes being used to conduct hot ammonia gas, and a drier interrupting the gas conducting pipe between the rectifier and the cooling coil to extract the water from the gas, the drier comprising an upright tank, the gas conducting pipe entering the drier and terminating therein at the bottom thereof, the outlet from the drier being at the top of the drier.

3. In a refrigerating machine, a generator, a rectifier, a cooling coil, the rectifier and the cooling coil being formed of an outside and an inside pipe, one of the pipes being used to conduct hot ammonia gas, a drier interrupting the gas conducting pipe, the drier comprising an upright tank, the gas conducting pipe extending vertically downward therein and having an open end near the bottom of the tank, the outlet of the drier being at the top thereof and a pipe to conduct water from the drier to the generator.

4. In a refrigerating machine, a generator, a rectifier, a cooling coil, the rectifier and the cooling coil being formed of an outside and an inside pipe, one of the pipes being used to conduct hot ammonia gas, and a drier interrupting the gas conducting pipe, the drier comprising an upright cylindrical casing for condensation of water, an entrance pipe extending a major portion of its length within the drier and having an open end, and an outlet pipe leading from top of the drier.

In testimony, that I claim the foregoing, I have hereunto set my hand this 17th day of July 1907.

ABRAHAM DAY.

Witnesses:
E. A. PELL,
S. A. ROGERS.